United States Patent [19]

Mao et al.

[11] Patent Number: 4,511,667

[45] Date of Patent: Apr. 16, 1985

[54] COMPOSITE ZEOLITE-ASBESTOS CATALYSTS

[76] Inventors: Raymond L. V. Mao, 2725 Place Darlington, Apt. 1, Montreal, Quebec H3S 1L4, Canada; Peter H. Bird, 4166 Hingston Ave., Montreal, Quebec H4A 2J7, Canada

[21] Appl. No.: 571,348

[22] Filed: Jan. 16, 1984

[30] Foreign Application Priority Data

Apr. 26, 1983 [CA] Canada ................................. 426687

[51] Int. Cl.[3] ........................ B01J 29/08; B01J 29/28; B01J 21/16
[52] U.S. Cl. ...................................... 502/64; 502/71; 423/118
[58] Field of Search .................... 502/64, 71; 423/118, 423/328

[56] References Cited

U.S. PATENT DOCUMENTS

| | | |
|---|---|---|
| 3,244,643 | 4/1966 | Schwartz ............................. 502/64 |
| 3,287,281 | 11/1966 | Haden, Jr. et al. ................... 502/64 |
| 3,510,422 | 5/1970 | Cole et al. ......................... 502/64 X |
| 3,523,092 | 4/1970 | Kearby .................................. 502/64 |
| 3,692,700 | 9/1972 | Sawyer et al. ...................... 502/251 |

*Primary Examiner*—Carl F. Dees

[57] ABSTRACT

Composite zeolite-asbestos materials containing a zeolite component formed directly from an asbestos material are described. Usually the composite will comprise a matrix of asbestos and discrete zeolite crystal formations intimately associated therewith. In the case of chrysotile asbestos, the matrix usually retains its fibrous character and when the zeolite is ZSM-5, characteristic spherical nodules of the zeolite are present. The composite product may be used as a zeolite based shape selective catalyst or a zeolite-based morphological support for polyfunctional shape selective catalysts.

29 Claims, 6 Drawing Figures a) Magnification = 3,000

FIG. 1a b) Magnification = 10,000

FIG. 1b a) magnification = 500

FIG. 2a b) magnification = 8,000

FIG. 2b a) magnification = 5,000

FIG. 3a b) magnification = 20,000

FIG. 3b

COMPOSITE ZEOLITE-ASBESTOS CATALYSTS

DESCRIPTION OF THE PRIOR ART

This invention relates to the production of composite zeolite asbestos materials which can be used as catalysts. These catalytic materials show great potential in the conversion of alcohols to hydrocarbons, including those in the range of motor gasolines.

Zeolites have been known for over two hundred years and, when dehydrated by heat, present a porous solid that can absorb a wide variety of organic and inorganic molecules provided that they can pass through the orifices of the structure. Zeolites also have been used to separate components of mixtures and as bases for ion exchange systems used, for example, in water softening. Many of them have also generated considerable interest because of their catalytic properties.

ZSM-5 zeolite is a novel crystalline aluminosilicate which has shown very interesting shape selectivity properties in some important reactions, such as production of gasoline grade hydrocarbons from methanol, and selective production of paraxylene from toluene and methanol. Its shape selectivity is said to be due to its special structure of intersecting channels. Modifications in pore access, geometry and size (the "screening" effect) by silica coating, phosphorous addition or simply by synthesis parameter variation, can lead to enhanced shape selectivity effects. By intimate admixture of the ZSM-5 zeolite with a classical Fischer-Tropsch catalyst one can obtain more hydrocarbons in the gasoline boiling range than is predicted by conventional Schulz-Flory distribution law ("drain-off" action from the ZSM-5 component).

W. H. Sawyer and H. F. Robson's U.S. Pat. No. 3,692,700 may, on first glance, appear to be close to our invention. In U.S. Pat. No. 3,692,700 various forms of chrysotile asbestos used as catalysts are described (chrysotile asbestos is a compound of mixed oxides of magnesium and silica, having a fiber form macrostructure and containing some impurities, such as the oxides of iron, aluminum and calcium). However, according to Sawyer and Robson's patent, the asbestos materials have kept the original crystalline structure of the chrysotile, even after modification, which is that of a phyllosilicate or layered silicate.

R. J. Argauer and G. R. Landolt, (U.S. Pat. No. 3,702,886), teach how to make crystalline ZSM-5 zeolite materials with catalytic activity. Kulkarni et al, in "Studies in the synthesis of ZSM-5 zeolites", Zeolites, Vol. 2, p. 313, October 1982, teach methods of making zeolites starting with sodium silicate. Lucki and Brennan, in U.S. Pat. No. 4,207,208, describe the very common procedure of incorporating zeolites and particularly ZSM-5 zeolites, in various matrices, or of adding "promoters" to these zeolites. In such procedures, these matrices or promoters are admixed mechanically with, or "coated" on the zeolites already made (a post-synthesis treatment).

X-type zeolite is a synthetic zeolite first prepared by R. H. Milton in U.S. Pat. No. 2,882,244. Today, X-type zeolites have a wide range of uses including as a catalyst, adsorbent and in ion exchange. Growth of crystals of X-type zeolites is described by J. F. Charnell in J. Crystal Growth, Vol. 8, p. 291, 1971, North Holland Publishing Co.

It is worth noting that the scientific and patent literature have not yet mentioned any attempt to crystallize zeolite on and/or in asbestos fibers.

SUMMARY OF THE INVENTION

The present invention relates to the conversion of magnesium-leached asbestos to a composite zeolite-asbestos material. The invention relates to the formation of zeolites inside and on the asebestos fibers from which part of the magnesium component has been removed so that the original macrostructure of the asbestos can be preserved and a composite zeolite-asbestos material results.

The present invention encompasses several steps and compounds, all flowing from the fundamental invention of taking asbestos materials and ultimately manufacturing composite zeolite-asbestos materials having intimately intermingled zeolite crystalline and asbestos components.

The zeolite can be made in situ in the asbestos using the asbestos as a starting material. This is a two-step process in which an intermediate composition consisting of a composite zeolite-asbestos-zeolite-promoter-substance material having a microstructure having intermingled zeolite and asbestos materials together with a zeolite promoter substance is first made and this is then converted into a composite zeolite-asbestos material.

The intermediate composition of a composite crude zeolite-asbestos-zeolite-promoter substance, having intermingled crude zeolite and asbestos formations together with a zeolite-promoter substance, is made by (a) leaching asbestos with an acid solution until part of the metal components of the asbestos lattice is solubilized;

(b) impregnating the dried solid from (a) with a mixture of zeolite-promoter substance and alkali metal hydroxide in aqueous solution, incubating at an elevated temperaure sufficient to favor the formation of complex silicates and adding a solution of an aluminate of an alkali metal and continuing to incubate at an elevated temperature to obtain a geliform suspension, adding further zeolite-promoter substance, the quantities and proportions of materials added being sufficient to ensure the production of zeolite in subsequent treatment;

(c) heating the resulting incubated mixture sufficiently to yield crude zeolite formations in situ and yield the composite zeolite-asbestos-zeolite-promoter material.

This composite zeolite-asbestos-zeolite-promoter-substance material can be converted to a solid composite zeolite-asbestos material having microstructure having intimately intermingled zeolite and asbestos components by (d) washing to remove extraneous ions from the solid residue resulting from step (c) above and drying the resulting residue; and (e) subjecting the solid residue composite to an elevated temperature sufficient to remove zeolite-promoter substance, to leave a composite zeolite-asbestos material and to free catalytically active surfaces. The composite zeolite-asbestos material can be converted to an H-form catalyst by the additional steps of treating the composite zeolite-asbestos material with aqueous ammonium salts or with dilute acid under reflux conditions, separating, drying and subsequently heating the solid residue resulting therefrom to an elevated temperature to form catalytically active surfaces in said H-form catalyst.

DESCRIPTION OF DRAWINGS

FIG. 1 is a pair of scanning electron micrographs at different magnifications (FIG. 1a magnification is 3,000×, FIG. 1b magnification is 10,000×) showing characteristically spherical ZSM-5 particles attached to asbestos fibers, both materials ultimately being derived from chrysotile material.

FIG. 2 is a pair of scanning electron micrographs at different magnifications (FIG. 2a magnification is 500×S, FIG. 2b magnification is 8,000×) showing characteristically spherical ZSM-5 particles attached to asbestos fibers, both materials ultimately being derived from asbestos cement.

FIG. 3 is a pair of scanning electron micrographs at different magnifications (FIG. 3a magnification is 5000×, FIG. 3b magnification is 20,000×) showing small ZSM-5 particles attached to asbestos fibers, both materials ultimately being derived from asbestos cement. The material of FIG. 3 differs from the material of FIG. 2 in that the material of FIG. 3 had been subjected to ultrasound in methanol suspension prior to preparation for electron microscopy, ultrasound rendering the small ZSM-5 particles more visible.

DESCRIPTION OF THE INVENTION

The present invention relates to the conversion of magnesium-leached asbestos to a composite zeolite-asbestos material. We have synthesized the zeolite using the silica supplied by the parent asbestos itself, by partially leaching the magnesium containing outer layer prior to zeolite formation and crystallization. Further, we have produced catalysts in which the zeolite grown inside the asbestos fibers provides the necessary active sites, and the remaining unleached magnesium acts as a molecular screen sieving molecules entering and leaving. Our catalysts exhibit greater shape selectivity than pure zeolite. With our procedure the distribution of the zeolite active sites in the final catalysts should be more uniform than that of catalysts prepared by other procedures which basically consist of crystallizing the pure zeolite first, and then admixing it in some way (for example, using mechanical or wet techniques) with a promoter or modifier. In such procedures, the added promoter or modifier, in particular, coating agents, are randomly distributed.

The leaching of the magnesium component may be performed by acid attack, with or without complexation of Mg with a complex anion. The leaching of magnesium via strong mineral acid treatment and under drastic conditions (high concentration in acid, several hours heating) can solubilize most of the magnesium (and other metallic components) leaving behind a collapsed macrostructure of geliform silica. Mild acid treatment with strong mineral acids or attack with weak acids like acetic acid, oxalic acid, etc., may preserve the chrysotile macrostructure, the magnesium content of which depends on the acid treatment conditions.

By using a concentrated aqueous solution of HCl under drastic conditions (see Example 1), we have removed quasi-totally the magnesium component from our chrysotile asbestos.

The content of magnesium in the asbestos leached this way is less than 1% of its original content in non-treated asbestos: nevertheless, the fiber-form is still maintained even with thermal treatment at 720° C. for several hours (see Example 2). When we suspended it in an aqueous medium, in the presence of Al, Na and tetrapropylammonium ion containing compounds, and when we heated the obtained suspension at a temperature ranging from 100° C. to 200° C. for times varying from several hours to several days, a zeolite was produced with a very high degree of crystallinity. Scanning electron micrographs show characteristic zeolite particles with a few amorphous fragments of asbestos residue. For example, by using diluted HCl solutions under mild conditions (see Examples 3 and 4) either on cement asbestos (4T30) or on mineral asbestos, we obtained partial leaching of the magnesium and, either after the magnesium removal operation or after the zeolite synthesis, the chrysotile fiber-form macrostructure was preserved.

Particularly, when we broke these fibers by means of ultrasonic radiation in methanol suspension, particles characteristic of the zeolite became more visible under the scanning electron microscope.

By controlling the degree of leaching of magnesium it is possible to obtain shape selective catalysts. Thus, from a practical viewpoint, our procedure and products provide a unique opportunity for great flexibility in producing valuable chemicals. Catalysts prepared according to our procedure exhibit great flexibility in product yields. In addition, as a result of a uniform distribution of a catalyst promoter (or modifier) and/or co-catalyst, both lack of reproducibility and rapid decay of catalytic activity can be greatly reduced. By introducing other active component(s), either during hydrothermal synthesis or after the synthesis, by impregnating or by other techniques of deposition on the zeolite asbestos, polyfunctional catalysts with controlled distribution either in zeolite component or in co-catalyst component(s), might be produced.

These polyfunctional catalysts should express both the zeolite shape selectivity and the intrinsic catalytic properties of the co-catalyst, thanks to a drain-off action between the two types of active sites. These catalysts should be more efficient than the catalysts where the active site distribution is random, as is usually obtained by previous procedures of preparation.

In the manufacture of a solid composite zeolite-asbestos material having a microstructure having intimately intermingled zeolite and asbestos components, it is possible to manufacture an intermediate composition, a composite crude zeolite-asbestos-zeolite-promoter material having intermingled crude zeolite and asbestos formations together with a zeolite-promoter substance. This intermediate composition, like the solid composite zeolite-asbestos material, can be an article of trade.

A method of making a composite crude zeolite-asbestos-zeolite-promoter material having intimately intermingled zeolite and asbestos formations together with a zeolite-promoter substance comprises:

(a) leaching asbestos with an acid solution until part of the metal components of the asbestos lattice is solubilized;

(b) impregnating the dried solid from (a) with a mixture of a zeolite-promoter substance and alkali metal hydroxide in aqueous solution, incubating at an elevated temperature sufficient to favor the formation of complex silicates and adding a solution of an aluminate of an alkali metal and continuing to incubate at an elevated temperature to obtain a geliform suspension, adding further zeolite-promoter substance, the quantities and properties of materials added being sufficient to ensure the production of zeolite in subsequent treatment;

(c) heating the resulting incubated mixture sufficiently to yield crude zeolite formations in situ. The asbestos used may be chrysotile asbestos. The metal components of the asbestos being solubilized are primarily magnesium components and at least 50% of the magnesium atoms of the asbestos lattice is solubilized. The acid used is a mineral acid, commonly hydrochloric acid, and the degree of leaching is between 50 and 99.8 and the acid concentration used is between 1N and 2.5N. It is worth noting, in passing, that leaching in strongly alkaline media provokes the leaching of silica.

After acid leaching [step (a)], an optional step before impregnation [step (b)] is to dilute the mixture with water sufficiently to allow eventually solubilized silica to be precipitated in the solid lattice.

In the impregnation step (b) the alkali metal hydroxide used may be sodium hydroxide and the aluminate of an alkali metal may be sodium aluminate. It is not entirely clear how the zeolite-promoter substance acts to promote the formation of zeolite. It appears likely that it may act in one of two different ways. It may act as a zeolite structure-forming substance and essentially act as a template promoting the formation of zeolite or it may act as a zeolite-crystal-growing substance aiding the accretion of crystals and promoting the growth of those crystals. Zeolite-structure-forming substances used have been selected from tetraalkylammonium compounds of the formula in which $R_1$, $R_2$, $R_3$, $R_4$ are selected from lower alkyl groups, and X is one of halide and a hydroxide. Tetraalkylammonium halides and hydroxide may be used, and, the compound we found particularly useful was the tetraalkylammonium halide, tetrapropylammonium bromide. When using a zeolite-structure-forming substance, the mixture is incubated in step (b) above at between 70° C. and 80° C., and subsequently subjected to a temperature between 140° C. and 190° C. in step (c), as a result of which, ZSM-5 formations are produced. Zeolite-crystal-growing substances used include triethanolamine and, when using a zeolite-crystal-growing substance, the mixture is incubated in step (b) above at between 55° C. and 65° C. and subsequently subjected to a temperature between 60° C. and 80° C. in step (c), as a result of which X-type formations are produced. Other zeolite-crystal-growing substances which may be used include sodium chloride, sodium carbonate and potassium chloride. Also Carbopol [trademark-B. F. Goodrich] has been used in the past for this purpose.

The composite crude zeolite-asbestos-promoter material that results from the above-mentioned steps can be made using chrysotile asbestos as the asbestos. Such a composite crude zeolite-asbestos-zeolite-promoter material would comprise: (a) silicon oxide, (b) aluminum oxide, (c) magnesium oxide, (d) ferric oxide, (e) sodium oxide, (f) a zeolite-promoter substance, and (g) water. Mole ratio ranges would be (b)/(a) between 0.001 and 0.5; (c)/(a) between 0.01 and 1.5; (d)/(a) between 0.005 and 0.1; (e)/(a) between 0.001 and 0.5; (f)/(a) between 0.001 and 0.8; (g)/(a) between 0.5 and 20. The material (f) can be one of the zeolite-structure-forming substances or zeolite-crystal-growing substances mentioned above.

To obtain the solid composite zeolite-asbestos material, the composite crude zeolite-asbestos-promoter material is (d) washed to remove extraneous ions from the solid residue and then dried, and (e) the solid residue composite is subjected to an elevated temperature sufficient to remove zeolite promoter substance, to leave a composite zeolite asbestos material and to free catalytically active surfaces. The material is commonly washed with water until the pH of the washing liquid is less than 9. Elevated temperatures used to drive off any remaining zeolite-promoter substance, leave a composite zeolite-asbestos material and free catalytically active surfaces are between 450° C. and 800° C., preferably between 475° C. and 525° C. The composite zeolite-asbestos material, having initially intermingled zeolite and asbestos components may have the zeolite component made in situ as described above. The asbestos may be chrysotile asbestos and the zeolite may be ZSM-5 or X-type. The composite zeolite-asbestos material may have zeolite crystal formations retained on a matrix of chrysotile asbestos fibers, the composite having the x-ray pattern of Table 1.

The composite zeolite-asbestos material may comprise: (a) silicon oxide; (b) aluminum oxide; (c) magnesium oxide; (d) ferric oxide; (e) sodium oxide; the mole ratios being: (b)/(a) between 0.001 and 0.5; (c)/(a) between 0.01 and 1.5; (d)/(a) between 0.005 and 0.1; (e)/(a) between 0.001 and 0.5. If the composite zeolite-asbestos material contains ZSM-5 zeolite, the mole ratios will be: (b)/(a) between 0.001 and 0.2; (c)/(a) between 0.01 and 1.5; (d)/(a) between 0.005 and 0.1; (e)/(a) between 0.001 and 0.2. If the composite zeolite-asbestos material contains X-type zeolite, the mole ratios will be: (b)/(a) between 0.3 and 0.5; (c)/(a) between 0.01 and 1.5; (d)/(a) between 0.005 and 0.1; (e)/(a) between 0.3 and 0.5.

These composite zeolite-asbestos materials may be in the form of catalysts, and such catalytic materials may be mixed with an inert carrier, such as bentonite.

These composite zeolite-asbestos materials may be converted to H-form catalysts by treating them with aqueous ammonium salts or dilute acid under reflux conditions, separating, drying and subsequently heating the solid residue resulting therefrom to an elevated temperature to form catalytically active surfaces in said H-form catalyst. The aqueous ammonium salt is often ammonium chloride and the elevated temperature used to form catalytically active surfaces is usually between 475° C. and 525° C.

It appears that with our procedure, once the outer-layered magnesium is partially leached, the inner-layered silica undergoes (during the synthesis operation at an elevated temperature) a structural change which leads to a zeolite framework based on the tectosilicate model (a tridimension framework). The main active centers (Bronstad and Lewis acid sites) are localized within the zeolite microcrystals corresponding to the aluminum atoms, which have been introduced during the zeolite synthesis and are actually integral components of the zeolite lattice.

(Common) Procedures for Characterizing the ZSM-5 Containing Asbestos

X-ray diffraction patterns were obtained by means of a standard Debye-Scherrer camera operating with powdered samples packed in capillary tubes. The radiation used was the K-alpha doublet of copper. The intensities of the diffraction lines were estimated using as reference the intensity ($I_o$) of the most strongest line to which the abbreviated symbol VS (very strong) was assigned. The relative intensities ($I/I_o$) are given the following symbols: S (strong), M (medium), Mw (Medium-weak), w (weak) and vw (very weak).

The vapor adsorption capacities (for water and n-hexane) were determined according to the gravimetric method developed by R. LeVanMao (React. Kinet. Catal. Lett., 12, 69, 1979).

Electron micrographs were done using a Model Hitachi S-520 scanning electron microscope (the operating conditions are given in the footnotes to the attached figures). Disruption of the zeolitic asbestos fibers was performed with ultrasound generated in a Fisher Ultrasonic Cleaner.

EXAMPLE 1 (SAMPLE CSZ-5F)

100 g of asbestos cement (chrysotile fibers with label 4T30; % weight compositions: $SiO_2=38.6$; $Al_2O_3=0.45$, $(FeO+Fe_3O_4)=4.14$; $MgO=39.9$) were suspended in a solution prepared from 200 ml of concentrated HCl and 750 ml of distilled water. The suspension was heated at 70°-80° C. with rapid stirring for 7 hours.

Then, 4000 ml of distilled water were added and the resulting suspension was allowed to stand for 12 h at room temperature. The suspension was filtered and washed with 2 liters of distilled water at room temperature. The solid was dried at 120° C. for 12 hours (the weight of the dried solid labelled ALIX-1 was 41 g and its %weight composition was: $SiO_2=86.6$; $Al_2O_3=<0.10$; $Na_2O=0.13$; $MgO=0.33$; $Fe_2O_3=0.35$). 8.97 g of ALIX-1, previously calcined at 720° C. for 2 hours, were suspended in a solution prepared from 14.923 g of tetrapropylammonium bromide (TPB Br from Fisher Sc. Co., <98%) and 0.539 g of NaOH (Fisher Sc. Co.) dissolved in 70 ml of distilled water. The suspension was heated at 70°-80° C. for 1 hour under vigorous stirring. Then, a solution of 0.495 g of sodium aluminate (Fisher Sc. Co., % weight composition: $Al_2O_3=46.79$; $Na_2O=28.44$) in 10 ml of distilled water was added. Heating was continued at 70°-80° C. with vigorous stirring for 10 minutes.

The suspension had the following overall molar composition:

| | | |
|---|---|---|
| $SiO_2 = 0.1295$ | $MgO = 0.0007$ | $H_2O = 4.44$ |
| $Al_2O_3 = 0.0023$ | $Fe_2O_3 = 0.0002$ | |
| $Na_2O = 0.0092$ | TPABr = 0.0560 | |

The suspension was transferred into a polypropylene bottle which was then put into a Sparr autoclave, and heated at 160° C. (±5° C.) for 12 days. After cooling, the suspension was discharged and filtered; the solid was washed with distilled water until the washing liquid had a pH lower than 9 and then dried at 120° C. for 12 hours (weight=9.86 g). Scanning electron micrographs show the ZSM-5 particles with their characteristic spherical shape as observed in a conventional ZSM-5 synthesis under the same conditions. The chemical composition of the solid was (% by weight):

| | |
|---|---|
| $SiO_2 = 77.9$ | $MgO = 0.27$ |
| $Al_2O_3 = 6.36$ | $Fe_2O_3 = 0.42$ |
| $Na_2O = 2.03$ | $C = 7.82$. |

This composition, expressed as mole ratios of oxides, is as follows:

(0.010) MgO, (2) $SiO_2$, (0.096) $Al_2O_3$), (0.004) $Fe_2O_3$, (0.050) $Na_2O$, 0.042 $(TPA)_2O$, z $H_2O$.

After activation in the air at 500° C. for 10 hours, the solid which appeared very crystalline, exhibited the x-ray pattern (strongest lines) shown in Table 1. Vapor adsorption at 19° C. gave the following results (% by weight):

Water (16.5 torr of $H_2O$)=12.23
n-hexane (45 torr of n-hexane)=14.29.

TABLE 1

| d (A) | $I/I_o$ | d (A) | $I/I_o$ |
|---|---|---|---|
| 11.02 | s | 3.31 | w |
| 10.02 | s | 3.06 | vw |
| 8.89 | vw | 2.98 | w |
| 6.66 | vw | 2.72 | vw |
| 6.37 | w | 2.60 | vw |
| 6.00 | w | 2.50 | vw |
| 5.60 | w | 2.40 | vw |
| 4.97 | w | 2.00 | mw |
| 4.62 | vw | 1.95 | vw |
| 4.24 | w | 1.91 | vw |
| 3.84 | vs | 1.87 | vw |
| 3.73 | s | 1.67 | vw |
| 3.66 | m | | |
| 3.47 | vw | | | s = strong,
vs = very strong;
m = medium,
mw = medium-weak;
w = weak,
vw = very weak.

EXAMPLE 2 (SAMPLE CSZ-5E)

11.4 g of ALIX-1 (without any preliminary calcination) were suspended in a solution prepared from 18.168 g of TPABr (Fisher) and 0.941 g of NaOH (Fisher) dissolved in 70 ml of distilled water. The suspension was heated at 70°-80° C. for 1 hour with vigorous stirring. A solution of 0.498 g of sodium aluminate (Fisher) dissolved in 10 ml of distilled water was added. We continued in heating at 70°-80° C. under intense stirring for 10 minutes. The suspension had the following overall molar composition:

| | | |
|---|---|---|
| $SiO_2 = 0.1645$ | $MgO = 0.009$ | $H_2O = 4.44$ |
| $Al_2O_3 = 0.0023$ | $Fe_2O_3 = 0.0003$ | |
| $Na_2O = 0.0143$ | TPABr = 0.0682 | |

The suspension was transferred into a polypropylene bottle which was then placed into a Sparr autoclave, and heated at 160° C. (±5° C.) for 12 days.

After cooling, the suspension was discharged and filtered; the solid was washed with distilled water until the washing liquid had a pH lower than 9 and then dried at 120° C. for 12 hours (weight=10.63 g).

Scanning electron micrographs show the ZSM-5 particles with their characteristic spherical shape as observed from a ZSM-5 conventional synthesis under the same conditions. The chemical composition of the solid was (% by weight):

| | |
|---|---|
| $SiO_2 = 81.2$ | $MgO = 0.30$ |

-continued

| | |
|---|---|
| Al$_2$O$_3$ = 3.78 | Fe$_2$O$_3$ = 0.32 |
| Na$_2$O = 1.34 | C = 7.76 |

This composition, expressed as mole ratios of oxides, is as follows:

(0.011) MgO, (2) SiO$_2$, (0.055) Al$_2$O$_3$, (0.003) Fe$_2$O$_3$, (0.032) Na$_2$O, (0.040) (TPA)$_2$O, z H$_2$O

After activation in the air at 500° C. for 10 hours, the solid which appeared very crystalline, exhibited an x-ray pattern (strongest lines) similar to that of Table 1.

Vapor adsorption at 19° C. gave the following results (% by weight):
  Water (16.5 torr of H$_2$O)=11.91
  n-hexane (45 torr of n-hexane)=13.65

EXAMPLE 3 (SAMPLE CSZ-5A)

5.2 g of chrysotile mineral (Thetfordmine; % weight composition: SiO$_2$=38.7; Al$_2$O$_3$=0.66; MgO=41.9; FeO+Fe$_3$O$_4$=5.12) were heated at 70°-80° C. for one hour with a solution of 20 ml of concentrated HCl and 80 ml of distilled water. The product was filtered, washed with distilled water and dried at 120° C. for 12 hours (labelled ALIX-0). 1.9 g of ALIX-0 was suspended in a solution prepared from 9.910 g of TPABr (Fisher) and 0.496 g of NaOH (Fisher) dissolved in 30 ml of distilled water. The suspension was heated at 70°-80° C. for 1 hour with vigorous stirring.

A solution of 0.56 g of sodium aluminate (Fisher) in 20 ml of distilled water was added. Heating was continued at 70°-80° C. with rapid stirring for 10 minutes.

The suspension was transferred into a polypropylene bottle which was then put into a Sparr autoclave, and heated at 165° C. (±5° C.) for 6 days. After cooling, the suspension was discharged and filtered; the solid was washed with distilled water until the washing liquid had a pH value lower than 9 and then dried at 120° C. for 12 h (wt.=1.71 g).

Figure 1A:
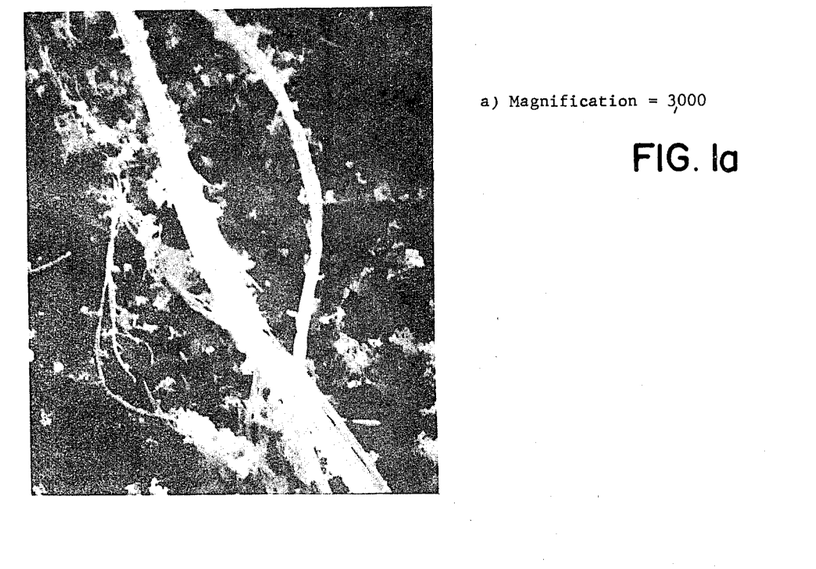
Figure 1B:
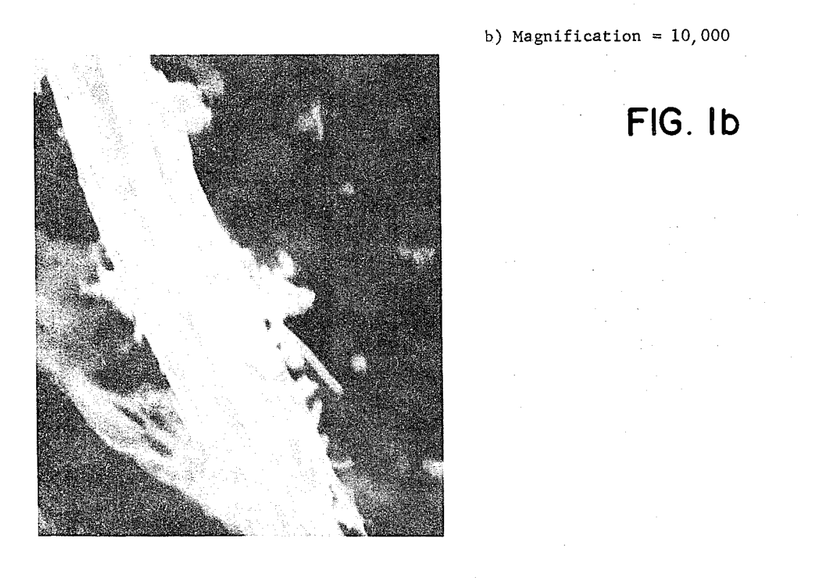

Scanning electron micrographs (FIG. 1) showed characteristic spherical ZSM-5 particles attached to the asbestos fibers.

The chemical composition of the solid was (% by wt.):

| | |
|---|---|
| SiO$_2$ = 51.6 | MgO = 16.2 |
| Al$_2$O$_3$ = 14.9 | Fe$_2$O$_3$ = 1.29 |
| Na$_2$O = 6.32 | C = 0.34 |

This composition, expressed as mole ratios of oxides, is as follows:

(0.94) MgO, (2) SiO$_2$, (0.340) Al$_2$O$_3$, (0.019) Fe$_2$O$_3$, (0.237) Na$_2$O, (0.003) (TPA)$_2$O, z H$_2$O

After activation in the air at 500° C. for 10 hours, the solid which appeared partially crystalline (in ZSM-5 structure), exhibited an x-ray pattern (most visible lines) similar to that of Table 1.

EXAMPLE 4 (SAMPLE CSZ-8A)

100 g of asbestos cement (chrysotile fibers with label 4T30) were suspended in a solution prepared from 150 ml of concentrated HCl and 1200 ml of distilled water. The suspension was heated at 70°-80° C. for 4 hours, under intense stirring. Then 1000 ml of distilled water was added and the resulting suspension was allowed to stand for several hours at room temperature. The suspension was filtered and washed with 1000 ml of distilled water at room temperature. The solid was dried at 120° C. for 12 hours (the weight of the dried solid-labelled ALIX-2 was 56 g) and its % weight composition was: SiO$_2$=63.6; Al$_2$O$_3$=0.08; Na$_2$O=0.51; MgO=14.9; Fe$_2$O$_3$=3.31).

9.9 g of ALIX-2 was suspended in a solution prepared from 15.388 g of TPABr (Fisher) and 0.515 g of NaOH (Fisher) dissolved in 90 ml of distilled water. The suspension was heated at 70°-80° C. for 1 hour with vigorous stirring. A solution of 0.519 g of sodium aluminate (Fisher) in 10 ml of distilled water was added. We continued in heating at 70°-80° C. with vigorous stirring for 10 minutes.

The suspension had the following overall molar composition:

| | | |
|---|---|---|
| SiO$_2$ = 0.1049 | MgO = 0.0369 | H$_2$O = 5.56 |
| Al$_2$O$_3$ = 0.0024 | Fe$_2$O$_3$ = 0.0021 | |
| Na$_2$O = 0.0096 | TPABr = 0.0578. | |

The suspension was transferred into a polypropylene bottle which was then put into a Sparr autoclave, and heated at 160° C. (±5° C.) for 12 days.

After cooling the suspension was discharged and filtered; the solid was washed with distilled water until the washing liquid had a pH lower than 9 and then dried at 120° C. for 12 hours (weight=10.03 g).

Figure 2A:
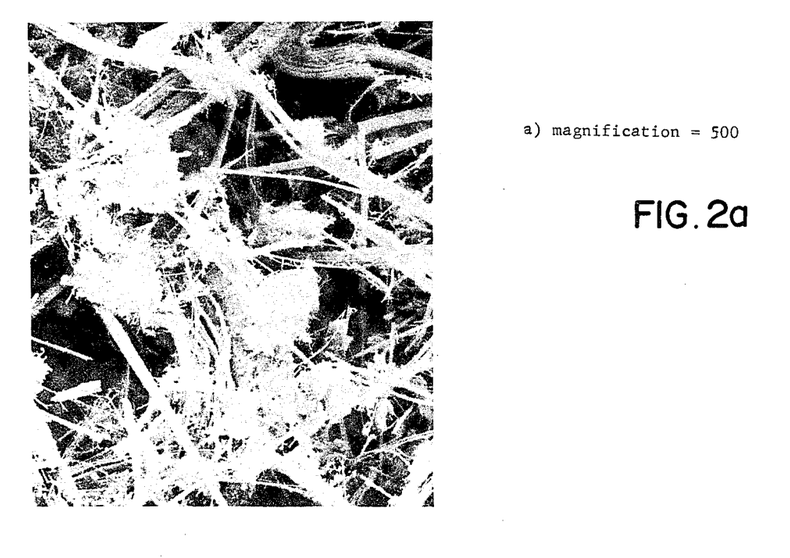
Figure 2B:
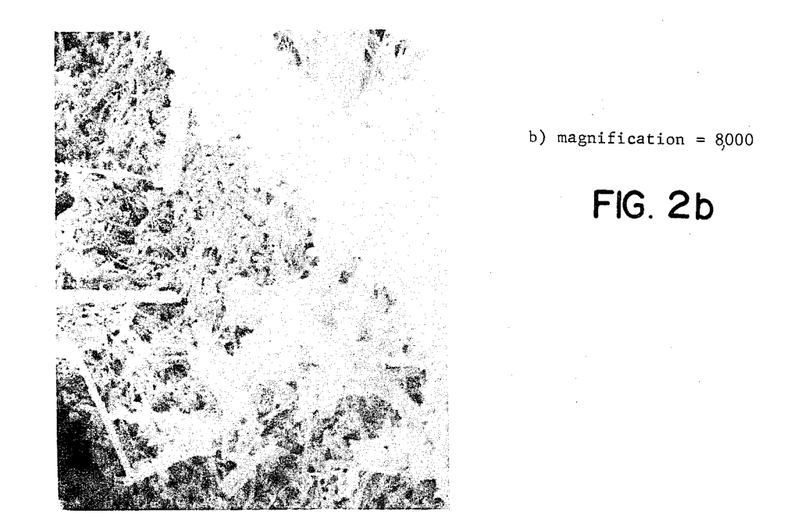
Figure 3A:
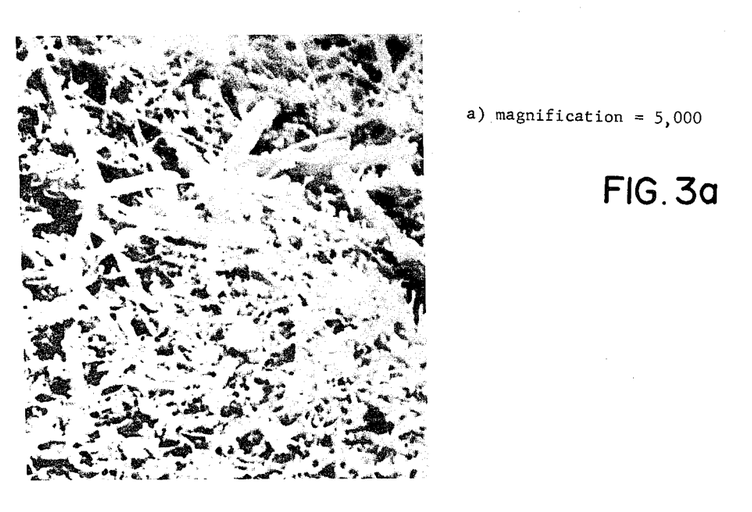
Figure 3B:
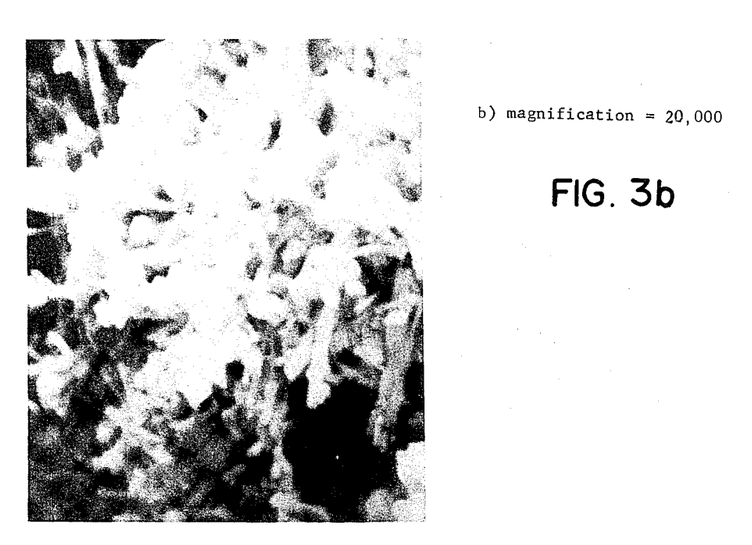

Scanning electron micrographs (FIG. 2) showed characteristic spherical particles attached to the fibers. Small ZSM-5 particles were more visible when the sample had been previously broken with ultrasound in methanol suspension (FIG. 3).

The chemical composition of the solid was (% by weight):

| | |
|---|---|
| SiO$_2$ = 65.8 | MgO = 14.5 |
| Al$_2$O$_3$ = 0.55 | Fe$_2$O$_3$ = 2.76 |
| Na$_2$O = 1.57 | C = 2.4 |

This composition, expressed as mole ratios of oxides, is as follows:

(0.661) MgO; (2) SiO$_2$; (0.010) Al$_2$O$_3$; (0.031) Fe$_2$O$_3$; (0.046) Na$_2$O; (0.015) (TPA)$_2$O; z H$_2$O.

After activation in the air at 500° C. for 10 h, the solid which appeared partially crystalline (in ZSM-5 structure), exhibited an x-ray pattern (most visible lines) similar to that of Table 1.

(Common) Procedures for Characterizing the X-type Zeolite-Containing Asbestos

X-ray diffraction patterns, vapor adsorption capacities and electron micrographs were made using substantially the same procedures that were used to characterize the ZSM-5 containing asbestos.

EXAMPLE 5

8.5 g of ALIX-1 (see example 1) previously dried at 120° C. for 10 hours, were suspended in a solution prepared by dissolution of 25 ml of triethanolamine and 3.6 g of NaOH in 180 ml of water. After heating at 60° C. for 1 hour, with vigorous stirring, a solution prepared from 9.8 g of sodium aluminate and 25 ml of triethanolamine dissolved in 180 ml of water was added. Heating and stirring were continued for another 10 minutes.

The gel was then poured into a polypropylene flask, covered and placed in an oven heated at 65°-70° C. for 5 weeks.

The resulting solid, washed with distilled water and dried at 120° C. for 10 hours, showed the following characteristics: (a) the x-ray pattern is very similar to that of the X-zeolite as reported in Table 4.88 of page 369, Reference "D. W. Breck, Zeolite Molecular Sieves", J. Wiley & Sons, 1974; (b) the crystal habit (observed in an optical microscopy) is similar to the octahedra of the X-zeolite as reported in FIG. 2 of page 393, Reference "J. F. Charnell, J. of Crystal Growth, 8, 1971"..

The following examples report the preparation procedure and the measurement of the catalytic activity in the methanol conversion of three samples: a pure ZSM-5 zeolite and two ZSM-5/asbestos samples with different degrees of magnesium leaching.

EXAMPLE 6 (SAMPLE H-CSZ-5E)

Preparation of the H-form 4.8 g of sample CSZ-5E, previously activated in the air at 500° C. for 10 hours, were brought in contact with a solution of $NH_4Cl$ at 5% by wt., using 19 ml of solution per gram of compound. The suspension was heated at 70°–80° C. under reflux condition and with moderate stirring. After 1 hour of heating, the suspension was allowed to settle and the liquid was then rapidly removed. A fresh volume of $NH_4Cl$ solution was added and the suspension was heated again for another hour.

The same procedure was repeated several times so that the entire operation lasted 5 hours.

The suspenson was filtered and the solid was washed until $Cl^-$ ions were no longer present in the washings. The compound was dried at 120° C. for 12 h and activated in the air at 500° C. for 10 h.

The chemical composition of the solid (3.6 g) now labelled H-CSZ-5E, was (% by wt.):

| | |
|---|---|
| $SiO_2$ = 93.1 | MgO = 1.61 |
| $Al_2O_3$ = 2.41 | $Fe_2O_3$ = 0.66 |
| $Na_2O$ = 0.25. | |

Catalyst Preparation 2.7 g of H-CSZ-5E sample were gently mixed with 0.29 g of bentonite. A few ml of distilled water were added and the wet paste was then extruded into rods (1 mm in diameter) which were dried at 120° C. for 12 hours and activated in the air at 500° C. for 10 hours.

Catalytic tests

Catalytic tests (for examples 6 and 7) were performed by injecting methanol from an injection syringe in an infusion pump into a methanol vaporizer and gas mixer. Nitrogen gas being supplied to the methanol vaporizer and gas mixer from a cylinder connected in-line with a flow meter. The vaporized methanol was then carried in the nitrogen gas through a catalyst bed set in a catalytic reactor which is itself set inside an oven with automatic thermoregulation. A chromel-alumel thermocouple was placed in the catalyst bed and was used, in conjunction with a digital thermometer unit, to monitor the temperature of the catalyst bed. The gaseous mixture flowing out of the catalytic reactor was run through a condensor at 15° C. to a liquid collector and a cylinder for gas sampling.

In particular, the run reported here used 2.2 g of H-CSZ-5E (final catalyst). The weight hourly space velocity (WHSV) which is defined as:

$$WHSV = \frac{\text{g of injected methanol per hour}}{\text{g of catalyst}}$$

is expressed in $hr^{-1}$.

After a pre-run of 10 minutes, the liquid products were collected and the gaseous ones were analyzed periodically by gas chromatography using a 16-foot column of squalane (3%) on silica gel (28–60 mesh).

For estimating the exact amounts of gaseous hydrocarbons produced, an external standard (ethylene diluted in nitrogen) was used.

The organic and aqueous phases of the collected liquid were separated and analyzed by gas chromatography using two 8-foot columns in sequence (Carbowax(TM) 5% on Chromosorb(TM) G; Silicone SE-30 10% on Chromosorb P) (TM). In the case of the aqueous phase, the quantitative estimation of the soluble products, including the unconverted methanol, required the use of an internal standard (n-butanol).

The catalytic data for H-CSZ-5E are reported in Table 2.

As terms of comparison, we used a pure ZSM-5 zeolite (U.S. Pat. No. 3,702,886, Ex. 3) in the H-form (H-CSZ-1C) and having the following chemical composition (% by wt.):

$SiO_2$ = 67.6
$Al_2O_3$ = 6.91
$Na_2O$ = <0.1

The actual catalyst H-CSZ-1C was obtained by making extrudates from a mixture of H-CSZ-1C/bentonite (10% by wt.) following the procedure previously described. Its catalytic data are also reported in Table 2.

EXAMPLE 7 (SAMPLE H-CSZ-8A)

Preparation of the H-form 3.3 g of sample CSZ-8A, previously activated in the air at 500° C. for 10 hours, were treated by an ion-exchange operation with a solution of $NH_4Cl$ at 5% by wt., following the same procedure as described in Example 6.

The resulting H-form (2.8 g), now labelled H-CSZ-8A, was (% by wt.):

| | |
|---|---|
| $SiO_2$ = 70.3 | MgO = 16.4 |
| $Al_2O_3$ = 6.77 | $Fe_2O_3$ = 3.45 |
| $Na_2O$ = 0.21. | |

Catalyst preparation 2.1 g of H-CSZ-8A sample was suspended in distilled water and submitted to the disrupting action of ultrasound for 10 hours. The compound dried at 120° C. for 12 h, was extruded with bentonite (20% by wt.).

TABLE 2

| | | | | | Selectivities (% C atoms on total hydrocarbons) | | | | | | | | |
|---|---|---|---|---|---|---|---|---|---|---|---|---|---|
| | | | | conversion | | $C_2$–$C_4$ olefins | | | | liquid hydrocarbons | | | |
| | | Duration | unconverted methonol | dimethyl-ether produced | to hydrocarbons | $C_1$–$C_4$ paraffins | | | | | $C_5$–$C_8$ aliphatics | BTX[b] (xylenes) | $C_8$[c] | Total |
| Sample | WHSV | (mn) | (%)[e] | (%)[e] | (%)[e] | | $C_2^{31}$ | $C_3^{31}$ | $C_4^{31}$ | Total | | | | |
| H-CSZ-1C | 3.93 | 200 | 0.2 | <0.01 | 99.8 | 21.4 | 11.6 | 29.7 | 13.2 | 54.4 | 0.9 | 16.7 (13.8) | 6.6 | 24.2 |
| H-CSZ-5E | 4.19 | 210 | 3.1 | <0.1 | 96.8 | 31.3 | 9.0 | 32.3 | 0.1 | 41.3 | 2.1 | 18.3 (15.7) | 7.0 | 27.4 |
| H-CSZ-8A | 4.17 | 230 | 40.8 | 0.6 | 19.2[d] | 10.7 | 21.0 | 41.8 | 21.0 | 83.8 | 1.1 | 2.7 (2.3) | 1.7 | 5.5 |

[a]Reaction conditions: atmospheric pressure, T = 400° C. ± 5° C.; wt. of methanol injected per hour = 9.44 g; molar ratio of methanol/$N_2$ in the feed = 9.2.
[b]benzene, toluene, xylenes and ethylbenzene.
[c]hydrocarbons heavier than $C_8$, up to $C_{10}$–$C_{11}$.
[d]side-reaction products: $CO_2$ and other volatile compounds
[e] $\frac{\text{no. of C atoms contained in the project}}{\text{no. of C atoms contained in the injected methanol}} \times 100\%$ The final catalyst was dried at 120° C. for 12 hours and activated in the air at 500° C. for 10 hours.

Catalytic tests

The H-CSZ-8A catalyst (2.3 g) was tested in the same apparatus and following the same operating and analysis procedures as in Example 6. The results are reported in Table 2.

As reported in Table 2, either the H-CSZ-5E sample or the H-CSZ-8A exhibited selectivities towards hydrocarbon products, quite different from those of the pure ZSM-5 zeolite, the H-CSZ-1C sample.

When the degree of magnesium leaching is very high (97%: case of the H-CSZ-5E sample), the catalyst yields more liquid hydrocarbons in the gasoline boiling range (and particularly more xylenes) than the pure ZSM-5 zeolite.

When the degree of magnesium leaching is relatively low (59%: case of the H-CSZ-8A sample), gaseous olefins ($C_2$–$C_4$) are the main products, while the conversion into hydrocarbons is relatively low.

This behaviour could be explained by an enhanced shape selectivity due to some "screening" action by the remaining magnesium in the zeolite-asbestos catalysts. Thus, by mastering control of the magnesium leaching degree, it is possible to produce very shape selective catalysts and, as a consequence, achieve more flexibility in producing valuable chemicals.

(The degree of magnesium leaching is defined as follows:

$$\frac{[Mg]_{OR} - [Mg]_X}{[Mg]_{OR}} \times 100\%$$

where $[Mg]_{OR}$ and $[Mg]_X$ stand for the concentrations by weight of magnesium in the parent asbestos and in the H-form of the ZSM-5/asbestos sample, respectively.)

EXAMPLE 8

This example shows the effectiveness of our composite materials as zeolite-supported catalysts in the deoxygenation of oxygenates, in particular the carbohydrates into hydrocarbons. For this purpose, three samples were prepared:

(1) HP-28

Pure ZSM-5 zeolite, prepared following a procedure similar to that for preparing the H-CSZ-1C sample (Examples 6 and 7) with a specific Si/Al atom ratio=23. The H-form of this zeolite was then admixed with low surface area silica (28% w/w) prior to its extrusion with bentonite.

(2) HP-15/2

Pure ZSM-5 zeolite, partially crystallized [degree of crystallinity circa 35%, measured according to the well-established method described by Kulkarni et al, Zeolites, Vol. 2 (4), 313, 1982], with a specific Si/Al atom ratio=38.

(3) HA-16

This composite ZSM-5/asbestos catalyst was prepared according to the following procedure: 100.5 g of 4T30 fibers were submitted to the Mg leaching operation with 1350 ml of a 1.3N HCl aqueous solution (4 hrs at 80° C.). 15.2 g of the resulting material (washed and dried) were submitted to a second leaching operation with 500 ml of a 3.5N $CH_3COOH$ aqueous solution (4 hrs at 80° C.).

12.0 g of the material obtained (washed and dried) was subjected to a hydrothermal zeolite synthesis in presence of 15 g of tetrapropylammonium bromide, 0.5 g of NaOH, 0.5 g of Na aluminate and 100 ml distilled water. The material washed, dried and activated (at 550° C.), $NH_4$ exchanged and activated again, exhibited the following characteristics:
  Si/Al atom ratio=29
  (Si+Al+Na+Mg+Fe)/Al atom ratio=36
  MLD (degree of magnesium leaching)=81.2%

The final forms of the previously described catalysts, obtained by extrusion of the H-forms with bentonite (15-20% w/w), exhibited an overall degree of crystallinity ranging from 25 to 30%.

The catalytic reaction was performed in a system similar to that described in Example 7. The reagent used was sorbitol, a sugar alcohol which has as a general formula: $C_6H_{14}O_6$. An aqueous solution of sorbitol was directly injected into the preheating zone. The reaction system (preheater+reactor) was maintained at 375° C.±5° C. The catalyst charge was 3.5 g and the duration of a run was 210 minutes.

In all our runs, the weight hourly space velocity (WHSV) with respect to sorbitol was kept equal to 0.36 hr$^{-1}$. In a series of runs, the amount of water in the feed was changed in such a way that the WHSV with respect to water, varied from 0.72 to 2.41 hr$^{-1}$.

Reaction products were analyzed by gas chromatography. Gaseous products were analyzed on-line by means of a 1.5 m long column packed with the Chromosorb P coated with squalane (20% by weight). For liquid products, a 12.5 m capillary column (of fused silica coated with a cross linked polymer obtained from Hewlett-Packard) was used.

The conversion of sorbitol was calculated as follows:

$$CONV\ (\%) = \frac{(IN) - (OUT)}{(IN)} \times 100$$

where (IN) and (OUT) were amounts of sorbitol fed and found in the products, respectively. The overall deoxygenating activity was calculated in the following way:

$$DEOX\ (\%) = \frac{SC_{HYDR}}{SC_{SORB}} \times 100$$

where $SC_{HYDR}$ and $SC_{SORB}$ were the amounts (in g) of hydrocarbons (found in the products) and of sorbitol (present in the feed), respectively.

The catalyst deactivation was determined as follows:

$$DEAC\ (\%) = \frac{(DEOX)_i - (DEOX)_f}{(DEOX)_i} \times 100$$

where $(DEOX)_i$ and $(DEOX)_f$ were the deoxygenating activities at reaction times i=30 mn and f=210 mn.

The C deposit onto the catalyst was measured by weighing the catalyst before and after the run, and calculated with respect to the sorbitol injected.

According to Chang et al (U.S. Pat. No. 3,998,898, 1976), an oxygenate which can easily deoxygenate has a value of R greater than 1. R is an empirically defined coefficient:

$$R = \frac{m - 2p}{n}$$

where m, p, n are the numbers of hydrogen, oxygen and carbon atoms in the molecule, respectively.

R value for sorbitol is less than 1 (R=0.3) and hence, the molecule is considered as difficult to convert (into hydrocarbons).

Since it has been said that a molecule like tetrahydrofurfuryl alcohol $C_5H_{10}O_2$ (R=1.2>1) could simulate products obtained by pyrolysis of organic (cellulosic) municipal waste (Frankiewicz, U.S. Pat. No. 4,308,411, 1981), sorbitol should be considered as a better candidate for representing such pyrolysis products, including those obtained by pyrolysis of wood wastes or similar (from coal, for example).

Table 3a shows that deoxygenating activity of our composite catalyst, with respect to activities observed with pure ZSM-5 based catalysts are significantly different. The beneficial effects of water in the feed are reported in Table 3b.

According to Frankiewicz, the best performances in deoxygenation of oxygenates were observed with catalysts which were very low in ZSM-5 zeolite content, and which were blended with non-acidic and low surface area materials.

The composite HA-16 sample satisfied all the previous conditions=low content in ZSM-5 zeolite, MgO matrix with non-acidic character and low surface area property (less than 10 m²/g).

TABLE 3a

Deoxygenating activity of various catalysts
[W.H.S.V. (sorbitol) = 0.36 hr$^{-1}$; W.H.S.V. (water) = 0.72 hr$^{-1}$]

| Catalyst | Deoxygenating Activity DEOX (%) | DEAC (%) | C Deposit (%) |
|---|---|---|---|
| HP-28 | 31 | 40 | 3.6 |
| HP-15/2 | 28 | 47 | 5.0 |
| HA-16 | 48 | 33 | 3.1 |

TABLE 3b

Effects of water
[HA-16 catalyst; W.H.S.V. (sorbitol) = 0.36 hr$^{-1}$]

| W.H.S.V. (Water; hr$^{-1}$) | CONV (%) | Deoxygenating Activity DEOX (%) | DEAC (%) | C Deposit (%) |
|---|---|---|---|---|
| 0.72 | 98.6 | 48 | 33 | 3.1 |
| 1.39 | 95.6 | 41 | 26 | 2.4 |
| 2.41 | 96.8 | 31 | 15 | 1.7 |

We claim:

1. A composite crude zeolite-asbestos-zeolite promoter material having a microstructure having intermingled crude zeolite and asbestos formations together with a zeolite-promoter substance.

2. The material of claim 1 comprising:
   (a) a silicon oxide
   (b) aluminum oxide
   (c) magnesium oxide
   (d) ferric oxide
   (e) sodium oxide,
   (f) a zeolite-promoter substance,
   (g) water in which the mole ratios are: (b)/(a) between 0.001 and 0.5; (c)/(a) between 0.01 and 1.5; (d)/(a) between 0.005 and 0.1; (e)/(a) between 0.001 and 0.5; (f)/(a) between 0.001 and 0.8; (g)/(a) between 0.5 and 20.

3. The material of claim 2 in which the zeolite-promoter substance (f) is a zeolite-structure-forming substance.

4. The material of claim 3 in which the zeolite-structure-forming substance is a tetraalkylammonium compound of the formula in which R$_1$, R$_2$, R$_3$, R$_4$ are selected from lower alkyl groups, and X is one of a halide and a hydroxide.

5. The material of claim 4 wherein the tetraalkylammonium compound is tetrapropylammonium bromide.

6. The material of claim 2 wherein the zeolite promoter substance (f) is a zeolite-crystal-growing substance.

7. The material of claim 6 wherein the zeolite-crystal-growing substance is triethanolamine.

8. A solid composite zeolite-asbestos material having a microstructure having intimately intermingled zeolite and asbestos components.

9. The composite zeolite-asbestos material of claim 8 wherein the zeolite component has been made in situ.

10. The composite zeolite-asbestos material of claim 8 wherein the zeolite is selected from a ZSM-5 zeolite and X-type zeolite.

11. The composite zeolite-asbestos material of claim 10 wherein zeolite crystal formations are retained on a matrix of chrysotile asbestos fibers, the composite having the x-ray pattern shown in Table 1.

12. The composite zeolite-asbestos material of claim 11 comprising:
   (a) a silicon oxide
   (b) aluminum oxide
   (c) magnesium oxide
   (d) ferric oxide
   (e) sodium oxide,
the mole ratio of (b)/(a) between 0.001 and 0.5; (c)/(a) between 0.01 and 1.5; (d)/(a) between 0.005 and 0.1; (e)/(a) between 0.001 and 0.5.

13. The composite zeolite-asbestos material of claim 12 in which the zeolite is a ZSM-5 zeolite, the mole ratio of (b)/(a) being between 0.001 and 0.2; (c)/(a) between 0.01 and 1.5; (d)/(a) between 0.005 and 0.1; (e)/(a) between 0.001 and 0.2.

14. The composite zeolite-asbestos material of claim 12 in which the zeolite is an X-type zeolite, the mole ratio of (b)/(a) being between 0.3 and 0.5; (c)/(a) between 0.01 and 1.5; (d)/(a) between 0.005 and 0.1; (e)/(a) between 0.3 and 0.5.

15. The composite zeolite-asbestos materials of claim 8 in the form of a catalyst incorporating a catalyst carrier.

16. A method of making a composite zeolite-asbestos-zeolite promoter material having intimately intermingled zeolite and asbestos formations together with a zeolite-promoter substance which comprises:
   (a) leaching asbestos with acid solution until part of the metal components of the asbestos lattice is solubilized;
   (b) impregnating the dried solid from (a) with a mixture of zeolite promoter substance and alkali metal hydroxide in aqueous solution, incubating at an elevated temperature sufficient to favor the formation of complex silicates and adding a solution of an aluminate of an alkali metal and continuing to incubate at an elevated temperature to obtain a geliform suspension, adding further zeolite promoter substance, the quantities and properties of materials added being sufficient to ensure the production of zeolite in subsequent treatment; and
   (c) heating the resulting incubated mixture sufficiently to yield crude zeolite formations in situ and yield the composite zeolite-asbestos-zeolite promoter material.

17. The method of claim 16 with the additional step between (a) and (b) of diluting the mixture with water sufficiently to allow solubilized silica to be precipitated in the solid lattice.

18. The method of claim 16 in which the metal components of the asbestos lattice being solubilized are primarily magnesium components and at least 50% of the magnesium atoms of the asbestos lattice is solubilized.

19. The method of claim 16 in which the degree of leaching is between 50 and 99.8% and the acid concentration used is between 1N and 2.5N, the acid is hydrochloric acid, the alkali metal hydroxide used to impregnate in (b) is sodium hydroxide, and the aluminate of an alkali metal used to impregnate in (b) is sodium aluminate.

20. The method of claim 16 in which the zeolite-promoter substance is a zeolite-structure-forming substance and the zeolite formations resulting from step (c) are ZSM-5.

21. The method of claim 16 in which the zeolite-structure-forming substance is a tetraalkylammonium compound of the formula wherein $R_1$, $R_2$, $R_3$, $R_4$ are selected from lower alkyl groups and X is one of a halide and a hydroxide.

22. The method of claim 21 in which the tetralkylammonium compound is tetrapropylammonium bromide.

23. The method of claim 20 in which the temperature used to impregnate in (b) is between 70° C. and 80° C., and the temperature used to form ZSM-5 zeolite formations in (c) is between 140° C. and 190° C.

24. The method of claim 16 in which the zeolite-promoter substance is a zeolite-crystal-growing substance and the zeolite resulting from step (c) is X-type zeolite.

25. The method of claim 24 in which the zeolite-crystal-growing substance is triethanolamine, the elevated temperature used to impregnate in step (b) is between 55° C. and 65° C. and the elevated temperature used to form zeolite in step (c) is between 60° C. and 80° C.

26. The method of claim 16 followed by (d) washing to remove extraneous ions from the solid residue resulting from step (c) and drying the resulting solid residue; and (e) subjecting the solid residue composite to an elevated temperature sufficient to remove zeolite-promoter substance, to leave a composite zeolite-asbestos material and to free catalytically active surfaces.

27. The method of claim 26 step (d) in which the solid residue is washed with water until the pH of the washing liquid is less than 9, and the method of step (e) in which the elevated temperature used is between 450° C. and 800° C.

28. The method of claim 26 followed by the additional steps of treating the composite zeolite-asbestos material with aqueous ammonium salts or with dilute acid under reflux conditions to convert to an H-form catalyst, separating, drying and subsequently heating the solid residue resulting therefrom to an elevated temperature to form catalytically active surfaces in said H-form catalyst.

29. The method of claim 28 in which the aqueous ammonium salt is ammonium chloride, and the elevated temperature is between 475° C. and 550° C.

* * * * *